Oct. 1, 1929.  F. L. JOHNSON  1,730,213
COLLAPSIBLE TIRE BUILDING FORM
Filed Sept. 2, 1927  3 Sheets-Sheet 1

INVENTOR.
Frank L. Johnson.
BY Ely & Barrow
ATTORNEYS.

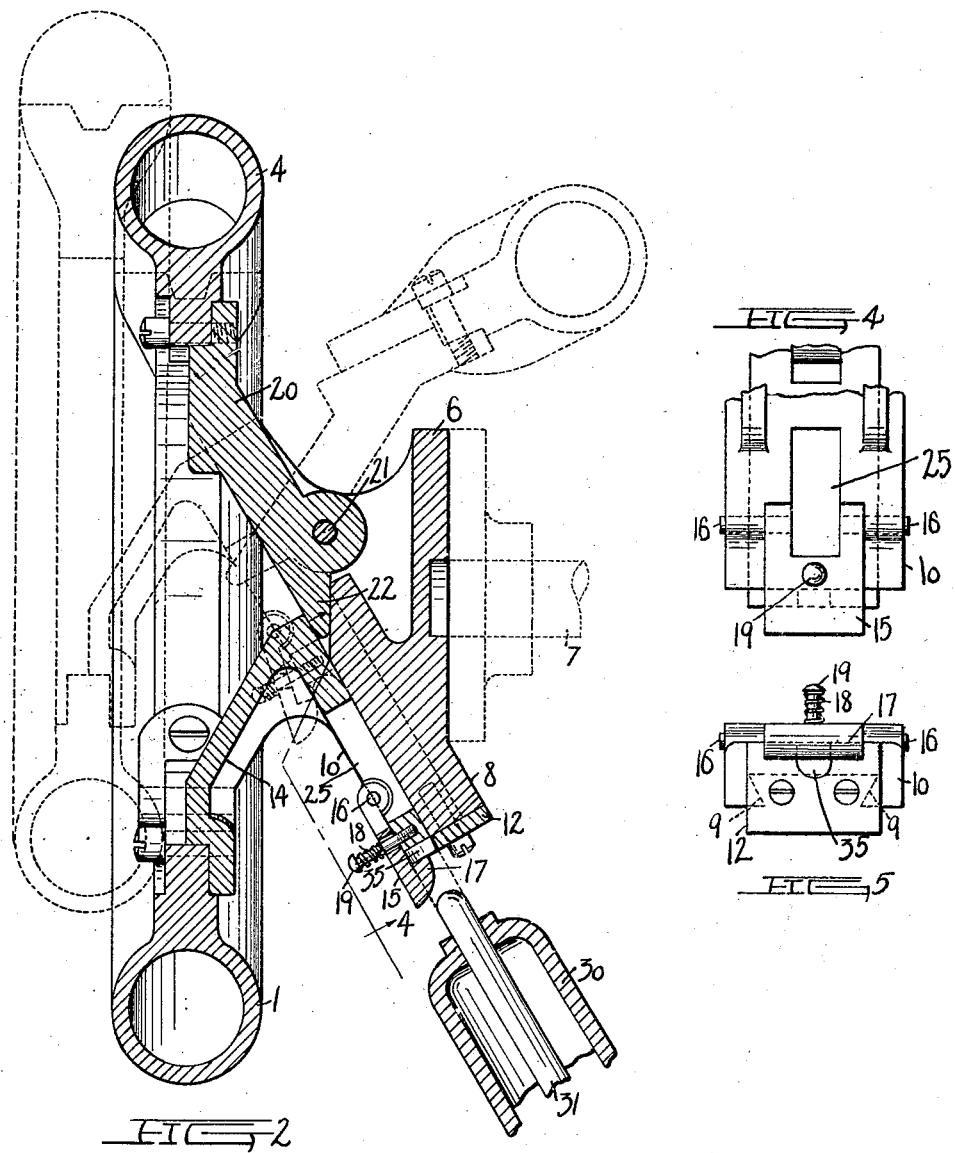

Oct. 1, 1929.  F. L. JOHNSON  1,730,213
COLLAPSIBLE TIRE BUILDING FORM
Filed Sept. 2, 1927  3 Sheets-Sheet 3
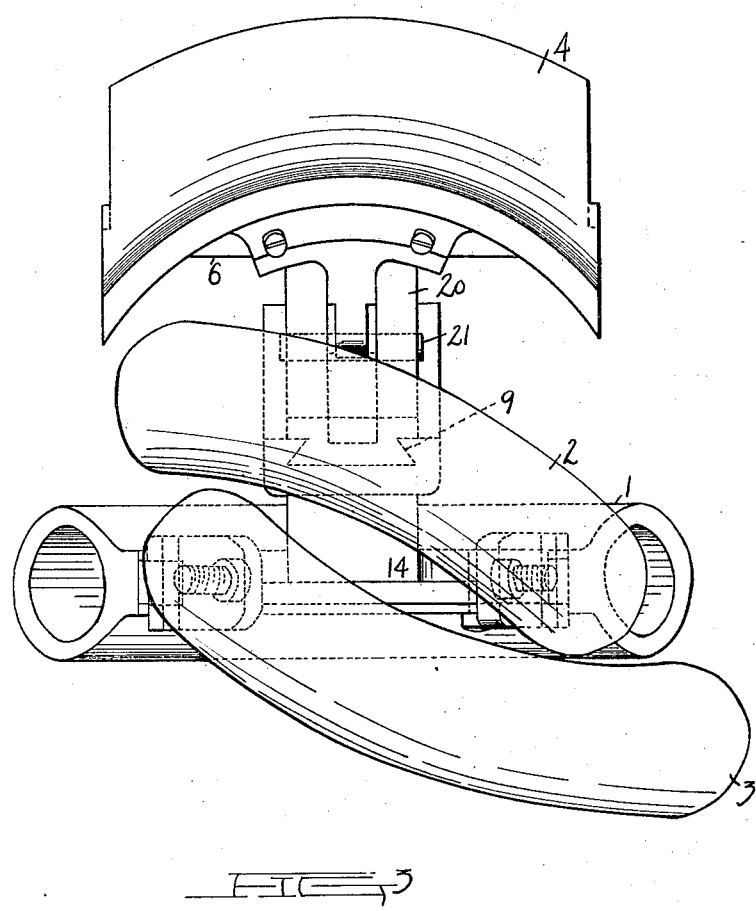
INVENTOR.
Frank L. Johnson
BY
ATTORNEYS.

Patented Oct. 1, 1929

1,730,213

UNITED STATES PATENT OFFICE

FRANK L. JOHNSON, OF AKRON, OHIO

COLLAPSIBLE TIRE-BUILDING FORM

Application filed September 2, 1927. Serial No. 217,134.

The present invention relates to collapsible tire building forms or cores upon which pneumatic automobile tires are constructed. Pneumatic tires are constructed with endless, inextensible, metallic beads in their inner edges, and it is necessary to construct, build and assemble them upon a collapsible core or form which can be removed from the interior of the carcass before the insertion of the air bag or expansible core upon which the tires are cured. The present invention relates to a new form of collapsible core which can be collapsed automatically. It is also an object of the invention to provide for a new and improved manner of assembling the core sections so that a maximum collapsing movement may be obtained.

In the construction of pneumatic tires, the tendency has been to smaller bead diameters and larger cross-sectional areas, which add considerably to the difficulties encountered in the construction and design of collapsible cores. The present core construction is capable of use in the manufacture of tires having the small opening in the beads through which the large core sections must be moved in collapsing the core. The core embodies also new principles of operation and obtains results not obtainable with cores of previous design.

Certain features of the invention, as set forth in the claims, are broadly new, particularly, the features of collapsing the core by means of fluid pressure operated mechanism acting upon the collapsing mechanism, as will be described, and the mounting of the key section, also to be described. These features, as well as others, may be embodied in cores of other specific designs, it being the intention to cover such broadly new features in such a way that they may be fully protected however employed. For this reason, the claims are not intended to be limited to specific details as shown and described, the invention being capable of modification and improvement, as will be understood by those skilled in this art. The invention may also be utilized in the construction of flat building drums, such as used in the "flat band" process of tire manufacture.

In the drawings,

Figure 2 is a section on the line 2—2 of Figure 1;

Figure 3 is a plan view of the core in collapsed position;

Figure 4 is a section on the line 4—4 of Figure 2; and

Figure 5 is an end view of the parts shown in Figure 4.

Figure 1:
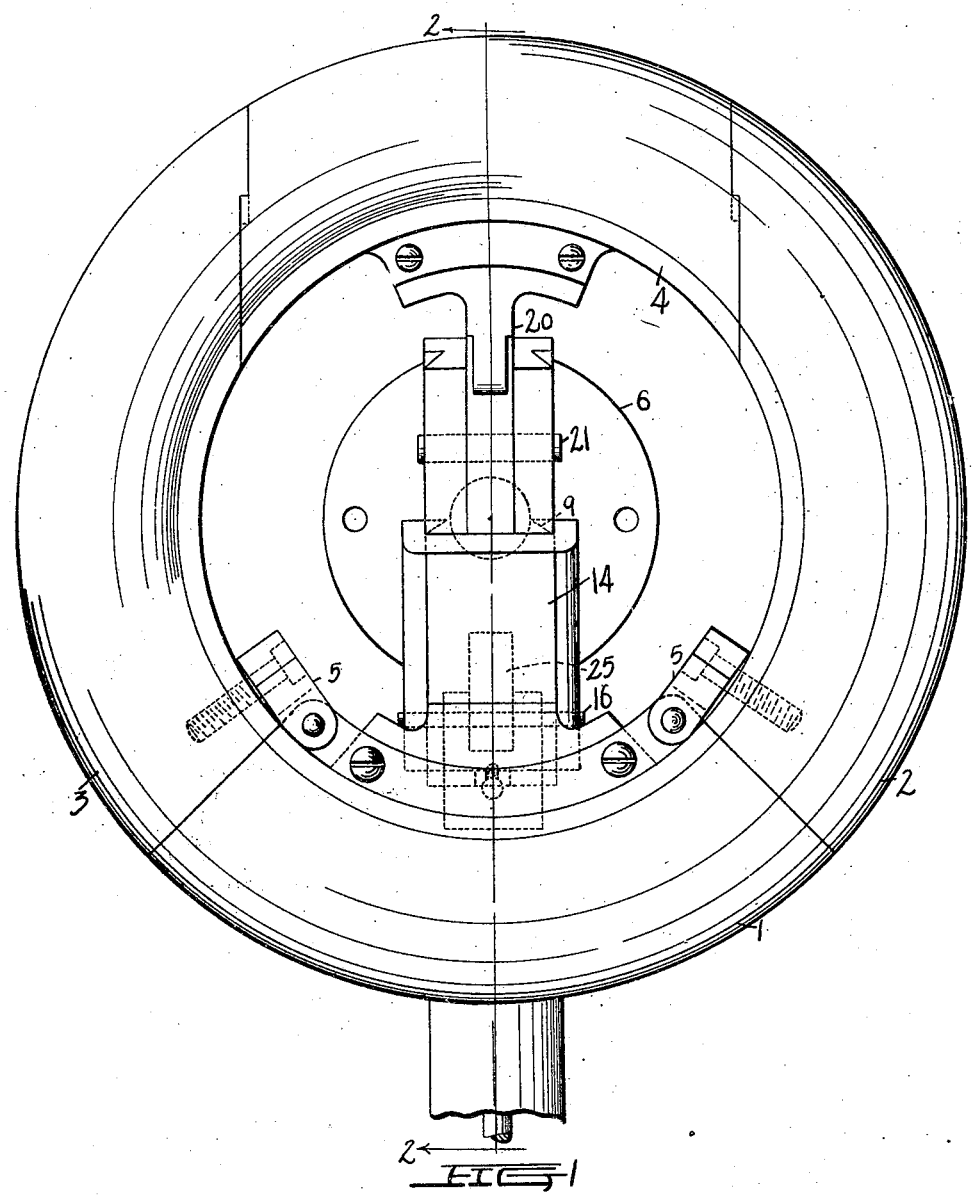
Figure 1 is a front elevation of the core in complete circular or erected condition.

The invention is illustrated as embodied in a tire building core such as used in the manufacture of tires by the standard method as distinguished from the "flat band" method. The core is composed of four sections, although this number may be increased or diminished if found practicable. These sections comprise a central or main section 1 and two sections 2 and 3 hinged thereto in a group by any suitable hinges 5 capable of compound or oblique movement as desirable. The other section 4, known as the key section, is separable from the remaining sections, being removed from the assembled core by movement of the sections 1, 2 and 3 as a group.

The complete core is carried upon a central supporting plate or chuck body 6 which may be attached to the rotatable shaft 7 of the tire building machine or tire building stand. From the chuck plate extends an oblique and upwardly directed bracket 8 which is formed with opposite guideways 9 upon which is mounted a sliding carriage 10. The end of the bracket is provided with a stop plate 12 which prevents the carriage from moving off the bracket. The inner end of the slide 10 is formed with an arm 14 which is attached at its outer end to the group of hinged core sections, through the central or main section 1.

The slide 10 is held at its outer limit of movement by a latch 15 pivoted to the slide at 16, the head 17 of the latch, which is rounded in its outer surface, engaging the plate 12. A spring 18 about a pin 19 holds the latch in engagement with the stop plate.

The key section 4 is secured to the outer end of an arm 20 which is pivoted at 21 on the chuck plate 6. The arm 20 is extended beyond the pivot 21 to provide a tail piece 22, which when the core is assembled, is held against the body of the chuck plate by the slide 10. The slide is provided with a slot 25, which, when the slide 10 carrying the group of core sections is moved to its outermost point, is directly over the tail piece 22 so that the key section may be swung out of the group of hinged sections and out of its original position in the core plane, as shown by the dotted line position in Figure 2.

Mounted at some convenient point in the tire machine (not shown) is a fluid operated cylinder 30 having a plunger 31 therein, in alignment with the slide when the core is in a position where the key section is at the top of the core, and so located that the end of the plunger is closely adjacent the end of the latch 17. When the core is to be collapsed, fluid pressure is applied behind the plunger 31 which is advanced, striking the end of the latch 17 so as to release the slide and then through the notch 35 in the stop plate 12, striking the lower end of the slide, and moving the whole group of sections with the slide upwardly and outwardly to the dotted line position in Figure 2. The movement releases the tire from the key section which may be swung backwardly out of the tire, whereupon the swinging sections are moved inwardly to the positions shown in Figure 3, and the tire carcass may be removed. In re-erecting the core, the reverse of the operation takes place, the group of sections being lowered by the plunger and the key section swung into place.

It will be observed that the operation of the improved core is quite simple and yet effective to obtain a very considerable collapsing movement. The device also lends itself to automatic operation by the cylinder and plunger, although these elements are not necessary to a realization of substantial benefits of the invention.

What is claimed is:

1. In a collapsible tire building core, the combination of a supporting plate, an oblique guideway on the plate, a slide movable upon the guideway, a group of core sections attached to the slide and movable thereon outwardly of the original core plane, and a separate core section pivotally mounted upon the plate for swinging movement inwardly of the original core plane.

2. In a collapsible tire building core, the combination of a supporting plate, a guideway upon the plate, a slide movable upon the guideway, a group of core sections attached to the slide and movable thereon in one direction from the original core plane, and a separate core section pivotally mounted upon the plate for swinging movement in the opposite direction from the original core plane.

3. In a collapsible tire building core, the combination of a supporting plate, a guideway upon the plate, a slide movable upon the guideway toward and from the axis of the core, a group of connected core sections attached to the slide and movable thereon outwardly of the original core plane, and a separate core section movably supported upon the plate and movable inwardly of the original core plane.

4. In a collapsible tire building core, the combination of a supporting plate, a guideway upon the plate, a slide movable upon the guideway toward and from the axis of the core, a group of connected core sections attached to the slide and movable thereby in one direction from the original core plane, and a separate core section movably supported upon the plate and movable in the opposite direction from the original core plane.

5. In a collapsible tire building core, a central supporting plate, a guideway upon the plate, a slide movable over the guideway toward and from the axis of the core, a group of pivotally connected sections carried upon the slide, an arm pivoted to the plate, and a separate core section on the arm, the arm being maintained in one position by the slide, but released for swinging movement when the slide is moved toward the core axis.

6. In a collapsible tire builing core, a central supporting plate, a guideway upon the plate, a slide movable over the guideway toward and from the axis of the core, a core section supported by the slide, an arm pivoted on the plate, a second core section carried by the arm, the arm being maintained in one position by the slide, but released for swinging movement when the slide is moved toward the core axis.

7. In a collapsible tire building core, a central supporting plate, a guideway upon the plate, a slide movable over the guideway, a core section carried by the slide, a second core section carried by the plate, means to lock the slide at its outer position, and a single means to release the lock and move the slide toward the axis of the core.

8. In a collapsible tire building core, a central supporting plate, a guideway upon the plate oblique to the core plane, a slide movable over the guideway, a core section carried by the slide, a second core section pivotally supported upon the plate for movement into a position at an angle to the core plane, a latch to hold the slide at its outer position, and a plunger adapted to release the latch and move the slide toward the core axis.

9. In a collapsible tire building core, a central supporting plate, a guideway upon the plate oblique to the core plane, a slide movable over the guideway, an arm on the core plate having a portion thereof locked in position by the slide at the outer limit of its movement, and core sections supported by the slide and by the arm respectively.

10. In a collapsible tire building core, a central supporting plate, a guideway upon the plate, a slide movable over the guideway, an arm on the core plate having a portion thereof held in position by the slide at the outer limit of its movement, and core sections supported by the slide and by the arm respectively.

11. In a collapsible tire building core, a central supporting plate, a guideway upon the plate oblique to the core plane, a slide movable over the guideway, an arm on the core plate having a portion thereof fixed by the slide at the outer limit of its movement, but released by movement of the slide over the guideway, a core section attached to the plate, a latch to hold the slide at the outer limit of its movement, and means to release the latch and to move the slide toward the core axis.

12. In a rotatable, collapsible tire building core, a central supporting plate, a guideway upon the plate at an angle to the plane of the core, a slide movable over the guideway, a group of core sections carried by the slide, and a plunger in alignment with the guideway in one position of the core and adapted to contact with the slide and move it over the guideway.

13. In a rotatable, collapsible tire building core, a central supporting plate, a guideway upon the plate at an oblique angle to the plane of the core, a slide movable over the guideway, a group of core sections carried by the slide, and a plunger in alignment with the guideway in one position of the core and adapted to contact with the slide and move it over the guideway.

14. In a rotatable, collapsible tire building core, a central supporting plate, a guideway upon the plate at an angle to the plane of the core, a slide movable over the guideway, a group of core sections carried by the slide, a plunger in alignment with the guideway in one position of the core and adapted to strike the slide and move it upon the guideway toward the axis of the core, and a separate core section held in position in the plane of the core but movable therefrom upon movement of the slide toward the axis of the core.

15. In a rotatable, collapsible tire building core, a central supporting plate, a guideway upon the plate at an angle to the plane of the core, a slide movable over the guideway, a group of core sections carried by the slide, a plunger in alignment with the guideway in one position of the core and adapted to strike the slide and move it upon the guideway toward the axis of the core, and a separate core section locked in position by the slide at its outward limit, but released upon movement of the slide toward the axis of the core.

16. In a rotatable, collapsible tire building core, a central supporting plate, a guideway upon the plate oblique to the plane of the core, a slide movable over the guideway, a group of core sections carried by the slide, a plunger in alignment with the guideway in one position of the core and adapted to strike the slide and move it upon the guideway toward the axis of the core, and a separate core section held in position in the plane of the core but movable therefrom upon movement of the slide toward the axis of the core.

17. In a rotatable, collapsible tire building core, a central supporting plate, a guideway upon the plate oblique to the plane of the core, a slide movable over the guideway, a group of core sections carried by the slide, a plunger in alignment with the guideway in one position of the core and adapted to strike the slide and move it upon the guideway toward the axis of the core, and a separate core section locked in position by the slide at its outward limit, but released upon movement of the slide toward the axis of the core.

18. A collapsible core, comprising a plurality of sections, a slide to which a section is attached, and a plunger mounted independently of the core, the slide lying in the path of the plunger and movable thereby.

19. A collapsible core, comprising a plurality of sections, a slide to which a section is attached, and a plunger mounted independently of the core, the slide lying in the path of the plunger and movable thereby in an oblique direction toward and from the axis of the core.

20. A collapsible core, comprising a plurality of sections, a slide to which a group of sections is attached, and a plunger mounted independently of the core, the slide lying in the path of the plunger and movable thereby in an oblique direction toward and from the axis of the core.

FRANK L. JOHNSON.